(12) United States Patent
Worrell et al.

(10) Patent No.: US 6,633,344 B1
(45) Date of Patent: Oct. 14, 2003

(54) PROCESSING OF PROGRESSIVE VIDEO SIGNALS IN DIGITAL TV RECEIVERS

(75) Inventors: Charles William Worrell, Carmel, IN (US); Michael Evan Crabb, Carmel, IN (US); Andrew Kent Flickner, Carmel, IN (US); Wenhua Li, Brownsburg, IN (US)

(73) Assignee: Thomson Licensing S.A., Boulogne Cedex (FR)

( * ) Notice: Subject to any disclaimer, the term of this patent is extended or adjusted under 35 U.S.C. 154(b) by 409 days.

(21) Appl. No.: 09/584,148

(22) Filed: May 31, 2000

Related U.S. Application Data
(60) Provisional application No. 60/144,152, filed on Jul. 15, 1999.

(51) Int. Cl.[7] .................................................. H04N 9/64
(52) U.S. Cl. ........................ 348/714; 348/555; 348/558; 348/715
(58) Field of Search ................................. 348/554, 555, 348/556, 558, 714, 715, 716; H04N 3/27, 5/46, 9/64

(56) References Cited

U.S. PATENT DOCUMENTS

| | | | |
|---|---|---|---|
| 4,905,099 A | 2/1990 | Mester et al. ............... 360/10.1 |
| 4,982,279 A | 1/1991 | Ishii et al. ................... 358/160 |
| 5,055,940 A | 10/1991 | Tomatsuri .................... 358/444 |
| 5,438,376 A | * 8/1995 | Watanabe ..................... 348/714 |
| 5,610,661 A | 3/1997 | Bhatt .......................... 348/446 |
| 5,631,713 A | 5/1997 | Hoshino ...................... 348/716 |
| 5,861,894 A | 1/1999 | Sotheran et al. ............ 345/516 |
| 5,949,441 A | * 9/1999 | Ristau ......................... 348/715 |
| 5,963,221 A | 10/1999 | Shimizu et al. ............. 345/508 |
| 6,122,315 A | * 9/2000 | Barnes ........................ 348/714 |
| 6,147,712 A | * 11/2000 | Shimamoto et al. ........ 348/446 |
| 6,177,922 B1 | * 1/2001 | Schiefer et al. ............. 348/441 |
| 6,297,848 B1 | * 10/2001 | Westerman .................. 348/448 |

* cited by examiner

*Primary Examiner*—John Miller
*Assistant Examiner*—Trang U. Tran
(74) *Attorney, Agent, or Firm*—Joseph S. Tripoli; Ronald H. Kurdyla; Vincent E. Duffy (57) ABSTRACT

A memory management process for buffering progressive, interlaced, CCIR 601/656 compliant, and MPEG compliant video signals in a video memory that is partitioned into first and second buffers. The process includes identifying the format of a received video signal, buffering the received video signal in the video memory in accordance with a standard buffering mode if the video signal is in an interlaced, CCIR 601/656 compliant, or MPEG compliant format, and buffering the received video signal in the video memory in accordance with an override buffering mode if the video signal is in a progressive format such as a 240p signal generated by a game console, VCR, cable text generator, and the like.

17 Claims, 8 Drawing Sheets

PROCESSING OF PROGRESSIVE VIDEO SIGNALS IN DIGITAL TV RECEIVERS

RELATED APPLICATIONS

This is a Non-Provisional Application of Provisional Application Serial No. 60/144,152 by Worrell et al., filed Jul. 15, 1999.

FIELD OF THE INVENTION

The present invention relates to processing progressive video signals in digital TV receivers.

BACKGROUND OF THE INVENTION

A standard Digital TV receiver architecture reuses MPEG digital video processing circuitry for the processing of digitized analog signals. Although this approach works well for processing digitized analog interlaced signals (e.g., NTSC and PAL signals having 480i or 1080i vertical formats), standard Digital TV receivers have difficulty processing the progressively scanned signals that are often produced by VCRs, video game consoles, and cable system text generators (e.g., progressively scanned signals having 240p vertical formats). The present invention is directed to overcoming this difficulty.

SUMMARY OF THE INVENTION

A memory management process for buffering digital video data of various formats (i.e., progressive, interlaced, CCIR 601/656 compliant, and MPEG compliant formats) in a video memory that is partitioned into first and second buffers.

DETAILED DESCRIPTION OF THE PREFERRED EMBODIMENT

The characteristics and advantages of the present invention will become more apparent from the following description, given by way of example.

Figure 1:
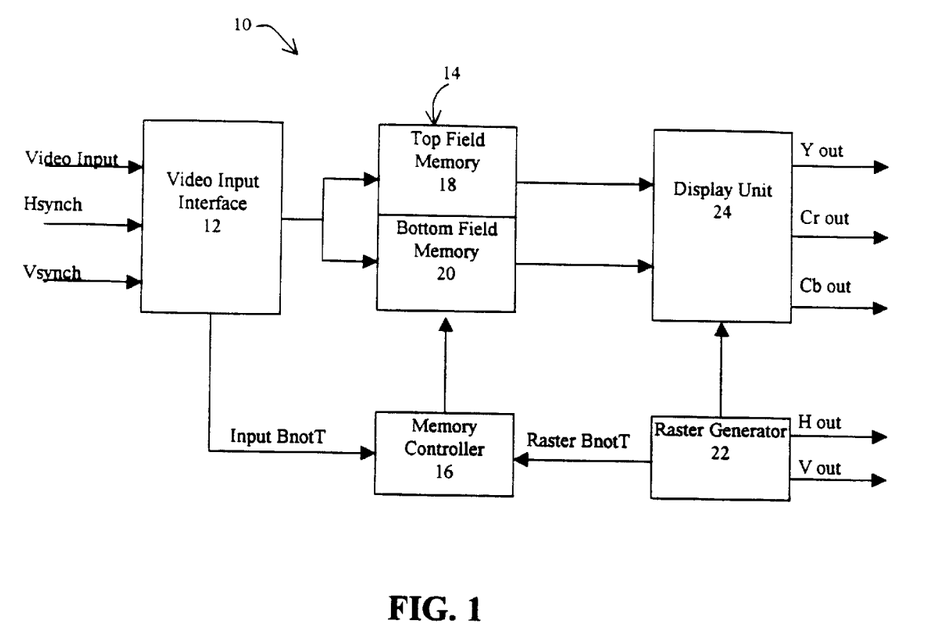
FIG. 1 is a logical system block diagram of video processing circuitry of a standard Digital TV receiver.

Referring to FIG. 1, the video processing circuitry 10 of a standard Digital TV receiver is shown. A video input interface 12 is coupled to a memory 14 and a memory controller 16. Memory controller 16 controls the buffering of MPEG compliant video data, CCIR 601/656 compliant video data, and digitized analog signals in memory 14, as described in further detail below. A raster generator 22 is also coupled to memory controller 16 as well as to a display unit 24 that includes display format conversion circuitry and OSD overlay circuitry.

Video input interface 12 is a video input port that manages the demuxing, sync processing, and field type detection of an input video signal. Video input interface 12 is capable of operating in two modes. One mode for receiving a CCIR 601/656 compliant bitstream and the other mode for receiving digitized analog signals. In the first mode, video input interface 12 extracts a known top/bottom field indication from a CCIR 601/656 compliant bitstream. In the second mode, blanking information is provided on Hsynch and Vsynch inputs of video input interface 12 and video input interface 12 derives the top/bottom field indication from the relative timing of the Hsynch and Vsynch inputs. More specifically, for an interlaced signal the Vsynch input will toggle between aligning with the Hsynch input and occurring between consecutive Hsynch inputs. For a progressive signal the Vsynch input will not toggle and will either align with the Hsynch input or occur between consecutive Hsynch inputs. Thus, alternating top and bottom indicators will be derived for an interlaced signal and either top or bottom indicators will be derived for a progressive signal. Once the top/bottom field indication is extracted (in the case of a CCIR compliant bitstream) or derived (in the case of a digitized analog signal), video input interface 12 generates an Input BnotT signal based on the top/bottom field indication and passes the signal to memory controller 16. More specifically, a field type detector (not shown) within video input interface 12 generates a "high" Input BnotT signal in response to a bottom field indicator and generates a "low" Input BnotT signal in response to a top field indicator.

It should be noted that MPEG decoding circuitry (not shown to simplify the drawings) may be distinct from or integrated with video input interface 12 for the decoding of an MPEG compliant bitstream, as known by those skilled in the art. During the decoding of an MPEG compliant bitstream, memory controller 16, in response to signals generated by the MPEG decoding circuitry, utilizes memory 14 for buffering the incoming compressed bitstream, storing anchor frames, and for storing the decoded video frames. Once a frame of video has been stored in memory 14 it is processed by display unit 24 in the same fashion as the processing of the CCIR 601/656 compliant and interlaced video signals described below.

Memory controller 16 manages the transfer of video data (e.g., MPEG compliant data, CCIR 601/656 compliant data, interlaced fields, and progressively scanned frames) to and from memory 14. More specifically, memory 14 is partitioned into two buffers (top field memory 18 and bottom field memory 20) and memory controller 16 manages the input of the video data to buffers 18 and 20 based upon the state of the Input BnotT signal transmitted by video input interface 12 or, in the case of the reception of an MPEG compliant datastream, based upon a signal generated by MPEG decoding circuitry. Memory controller 16 also manages the output of the stored video data from buffers 18 and 20 to display unit 24 which, in turn, processes the outputted data such that the data is adapted to a desired display format and combined with a desired OSD. Memory controller 16 manages the output of the video data from buffers 18 and 20 based upon the state of a Raster BnotT signal transmitted by raster generator 22.

Figure 2:
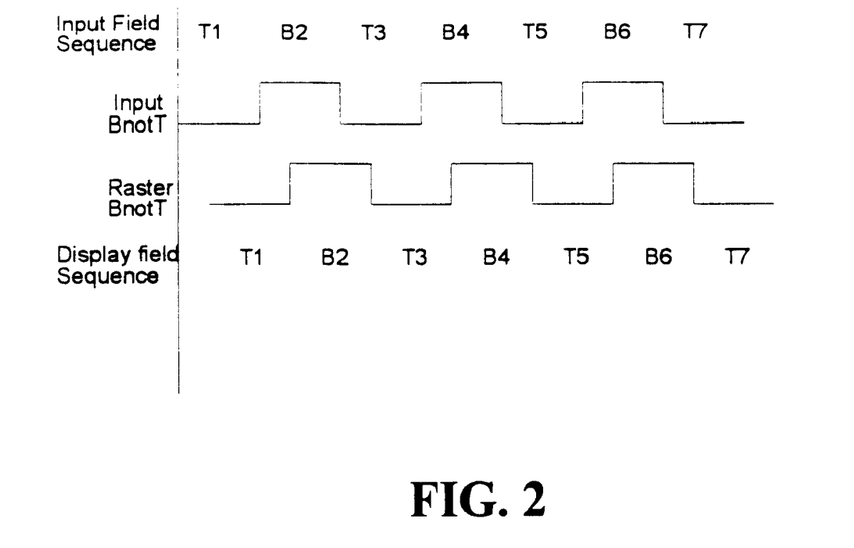
FIG. 2 is a timing diagram of the standard receiver processing an interlaced input signal.

The Raster BnotT and Input BnotT signals are generated separately and may not be phase or frequency locked. Video input interface 12 generates the Input BnotT signal based on the top/bottom field indicators extracted from a CCIR 601/656 compliant bitstream or derived from the relationship between the Hsynch and Vsynch inputs of a digitized analog signal (e.g., an interlaced or progressive signal). Raster generator 22 generates the Raster BnotT signal asynchronously from the Input BnotT signal. The Raster BnotT signal is an independent raster signal generated by counters driven from VCXO derived pixel clock. The Raster BnotT signal provides a stable drive signal to the deflection system of display unit 24 and controls the sequence of fields retrieved from memory. Although the asynchronous relationship between the Input BnotT and Raster BnotT signals does not interfere with the storage and retrieval of MPEG compliant data, CCIR 601/656 compliant data, and interlaced video data, the asynchronous relationship interferes with the storage and retrieval of progressively scanned video data (e.g., video data in a 240p vertical format), as shown below. Referring now to FIG. 2, a timing diagram for the storage and retrieval of an interlaced signal is shown. More particularly, the relationship between the input video data, output video data, Input BnotT signal and Raster BnotT signal is shown. An indexed sequence of fields represents the memory location of the input and output video signal data, where T=top field memory and B=bottom field memory. Memory controller 16 writes the input data into bottom field memory 20 upon reception of a "high" Input BnotT signal and writes the input data into top field memory 18 upon reception of a "low" Input BnotT signal. Similarly, memory controller 16 reads the output data from bottom memory 16 upon reception of a "high" Raster BnotT signal and reads the output data from top field memory 18 upon reception of a "low" Raster BnotT signal. As shown in FIG. 2, the asynchronous relationship between the Input BnotT and Raster BnotT signals does not interfere with the proper storage and retrieval of video data for interlaced video signals.

Figure 3:
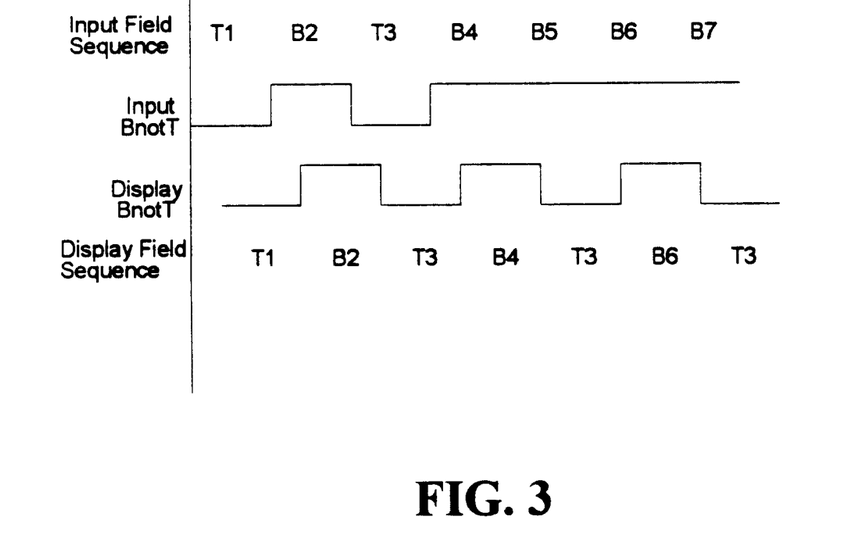
FIG. 3 is a timing diagram of the standard receiver processing a progressively scanned input signal.

Referring now to FIG. 3, a timing diagram illustrating the storage and retrieval of video data for an interlaced video signal followed by a progressive video signal is shown. Fields 1–4 correspond to fields of interlaced video data and are stored and retrieved from top and bottom field memories 18 and 20, as discussed above in the description of FIG. 2. Field 5 corresponds to a first frame of progressively scanned video data (e.g., a progressive video signal received from a game console or VCR that has been turned on by a user). At Field 5 the Input BnotT signal remains "high" indicating that the progressively scanned video data, for this exemplary timing diagram, has the same Hsynch/Vsynch relationship as the Field 4 portion of the interlaced video data. Since Input BnotT remains "high" memory controller 16 writes the frame of progressively scanned video data into bottom field memory 20. At fields 6 and 7 memory controller 16 continues to write the frames of progressively scanned video data into bottom field memory 20 since the top/bottom indication associated with the frames of progressively scanned video data does not change. In response to the reception of the Raster BnotT signal, memory controller 16 correctly reads the fields of interlaced video data from memory 14 (fields 1–4). However, memory controller 16 incorrectly reads the frames of progressively scanned video data from memory 14 (fields 5–7). More specifically, at fields 5 and 7 memory controller 16 reads stale video data from memory 14 (i.e., the interlaced video data of field 3) due to the reception of a "low" Raster BnotT signal from raster generator 22. This stale data will continue to be read out of top field memory 14 during the processing of the progressively scanned video data and will cause significant distortions in the video image displayed to a user. The present invention is directed to correcting this problem.

Figure 4:
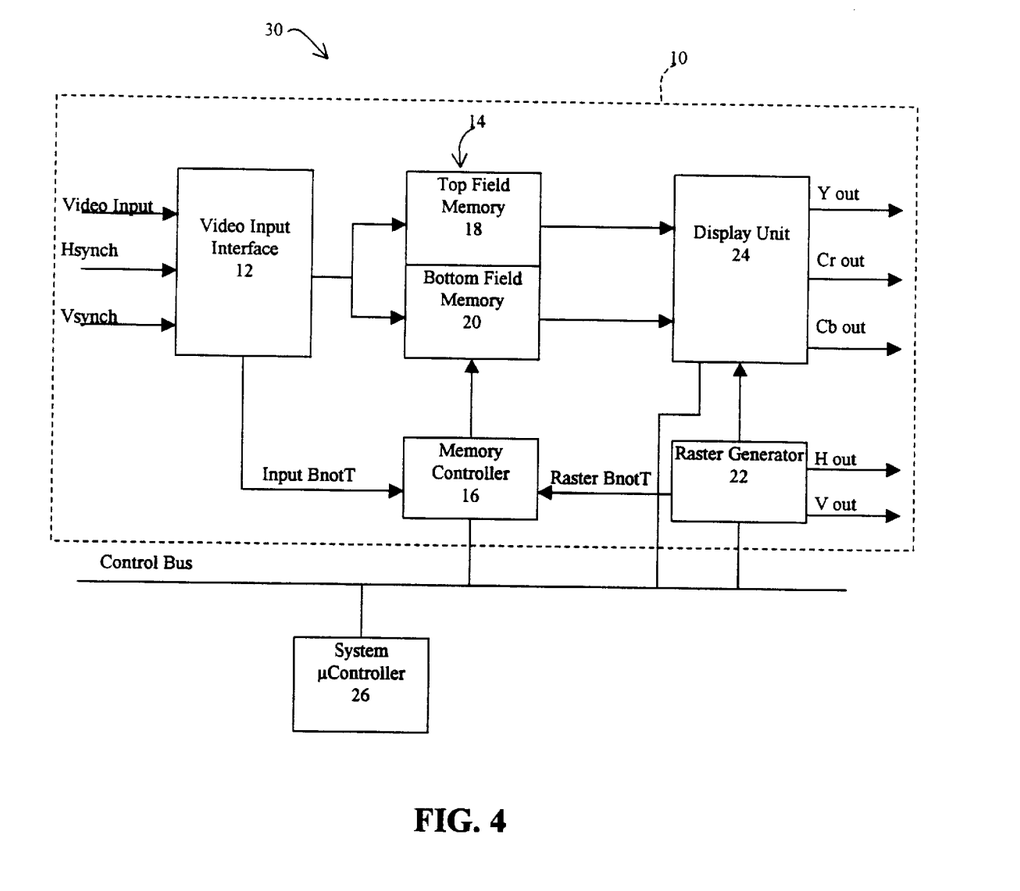
FIG. 4 is a logical system block diagram of video processing circuitry in accordance with the present invention.

Referring now to FIG. 4, a block diagram of video processing circuitry 30 of the present invention is shown and includes a system microcontroller 26 coupled to the video processing elements 10 of FIG. 1. More specifically, system microcontroller 26 is coupled to memory controller 16, raster generator 22, and display unit 24 such that video data in a progressively scanned format, an interlaced format, a CCIR 601/656 compliant format, or a MPEG compliant format is correctly stored in and retrieved from memory 14.

Figure 5:
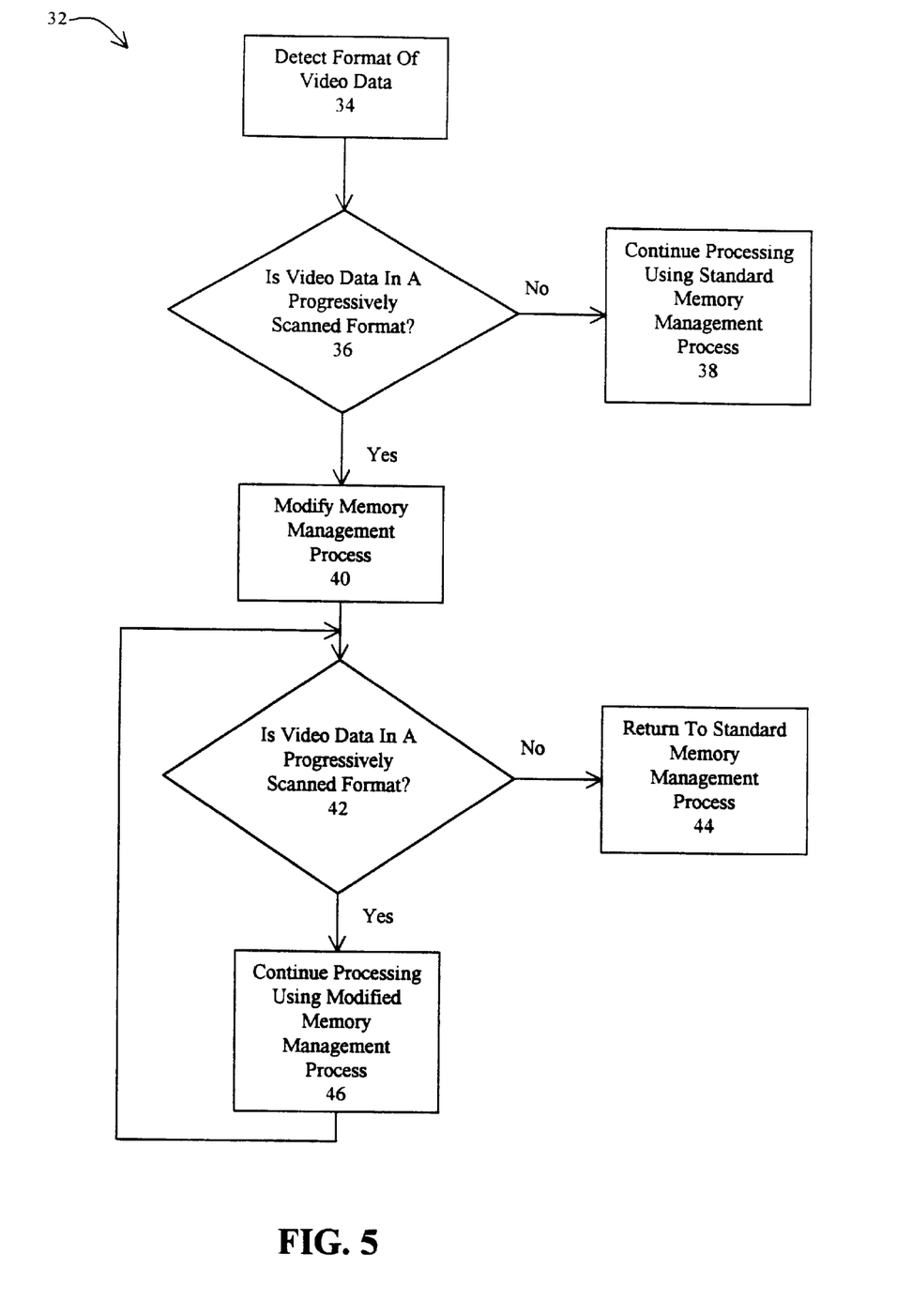
FIG. 5 is a flow chart illustrating a method of processing a progressively scanned video signal in accordance with the present invention.

Referring now to FIG. 5, in conjunction with FIG. 4, a method 32 of processing progressively scanned video data is shown. The progressively scanned video data may be a 240p input generated by a video game console, VCR, cable system text generator, or the like. Initially, system microcontroller 26, at step 34, determines the format of the video data received by video input interface 12 by reading the Input BnotT signal received by memory controller 16. As explained above, when the Input BnotT signal toggles between high and low states the video format is not progressive (e.g., fields 1–4 of FIG. 3). When the Input BnotT signal remains constant (i.e., low or high) for two or more consecutive periods the video format is progressive (e.g., fields 5–7 of FIG. 3). It should be noted that system microcontroller 26 may determine if video data in an MPEG compliant format is being received by monitoring the signals generated by MPEG decoding circuitry, as known by those skilled in the art. Next, at step 36, system microcontroller 26 determines if the video data is in a progressively scanned format. If not, system microcontroller 26, at step 38, continues to process the video data using the standard memory management process described above. If so, system microcontroller 26, at step 40, modifies or partially overrides the memory management process in accordance with the present invention, as described in further detail below. Afterwards, at step 42, system microcontroller 26 continues to monitor the Input BnotT signal received by memory controller 16 to determine if the video data is still being received in a progressively scanned format. If not, system microcontroller 26, at step 44, returns to the standard memory management process used for the processing of non-progressive video data. If so, system microcontroller 26, at step 46, continues to process the progressively scanned video data using the modified memory management process of step 40 and returns to step 42 to monitor the Input BnotT signal.

Figure 6:
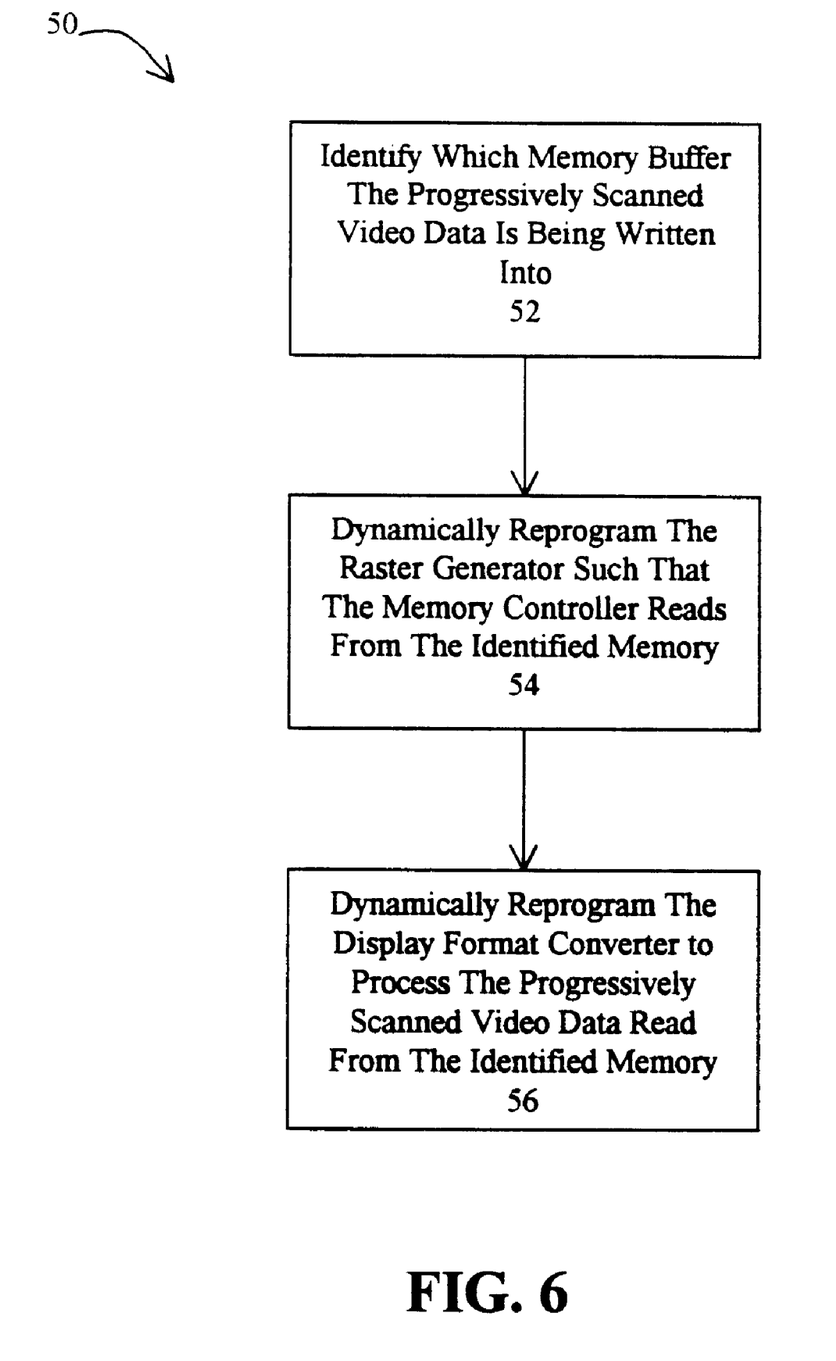
FIG. 6 is a flow chart illustrating a video memory management method in accordance with the present invention.
Figure 7:
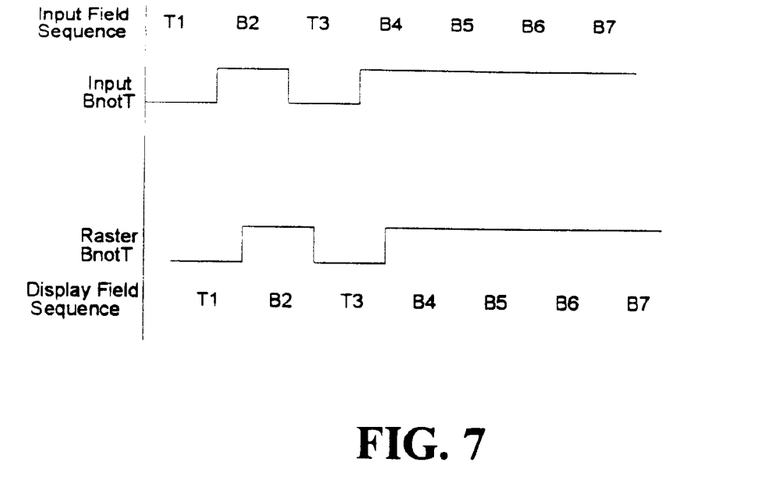
FIG. 7 is a timing diagram of an improved system processing a progressively scanned input signal in accordance with the video memory management method of FIG. 4.
Figure 8:
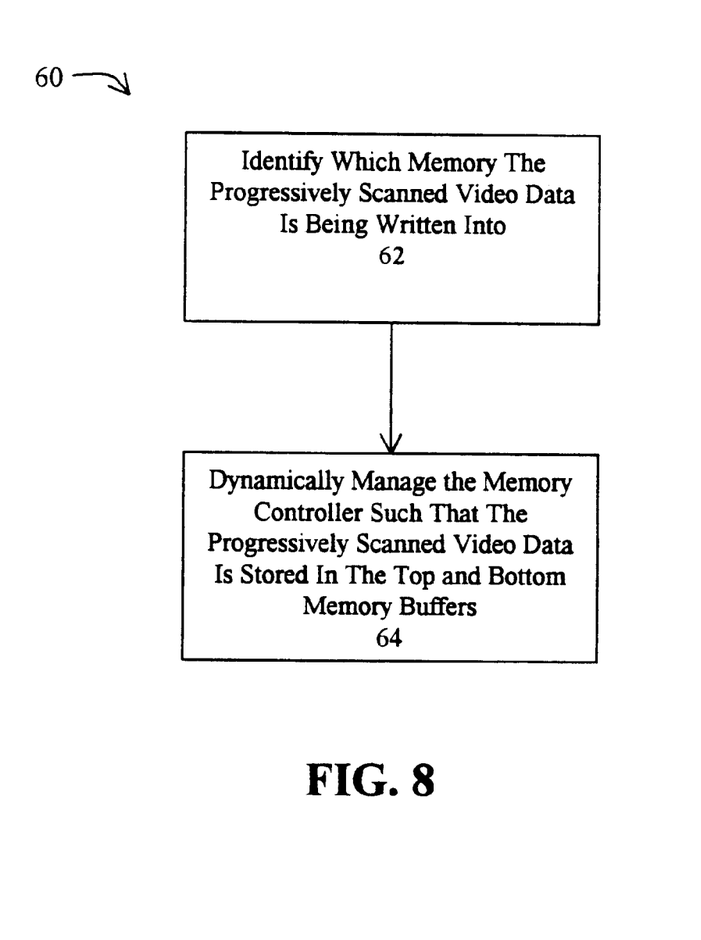
FIG. 8 is a flow chart illustrating an alternative memory management method in accordance with the present invention.

Referring now to FIGS. 6 and 7, in conjunction with FIG. 4, one memory management process 50 of the present invention is shown. After the format of the video data received by video input interface 12 is identified as progressive, system microcontroller 26, at step 52, monitors the state of the Input BnotT signal to identify which memory buffer (i.e., top field memory 18 or bottom field memory 20) is being written with the progressively scanned video data. Once the memory is identified, system microcontroller 26, at step 54, dynamically reprograms raster generator 22 such that memory controller 16 correctly reads the progressively scanned video data from the identified memory buffer (i.e., top field memory 18 or bottom field memory 20). As shown in the exemplary timing diagram of FIG. 7, if system microcontroller 26 determines that progressive video data is being written into bottom field memory 20 (i.e., the Input BnotT signal is "high"), system microcontroller 26 dynamically reprograms raster generator 22 to output a "high" Raster BnotT signal. The "high" Raster BnotT signal will force memory controller 16 to read the progressive video data from bottom field memory 20. System microcontroller 26, at step 56, also dynamically reprograms display unit 24 to process the progressively scanned video data received from the identified memory buffer of memory 14. For example, system microcontroller 26 may dynamically reprogram display unit 24 to convert a 240p signal retrieved from memory 14 to 540p, 1080i, or some other vertical format required by a monitor or TV. Turning now to FIG. 8, in conjunction with FIG. 4, an alternative memory management process 60 of the present invention is shown. After the video data format received by video input interface 12 is identified as progressive, system microcontroller 26, at step 62, monitors the state of the Input BnotT signal to identify which memory buffer (i.e., top field memory 18 or bottom field memory 20) is being written with the progressively scanned video data. Next, at step 64, system microcontroller 26 dynamically manages memory controller 16 such that memory controller 16 alternately writes the progressively scanned video data into top and bottom field memories 18 and 20 of memory 14.

Figure 9:
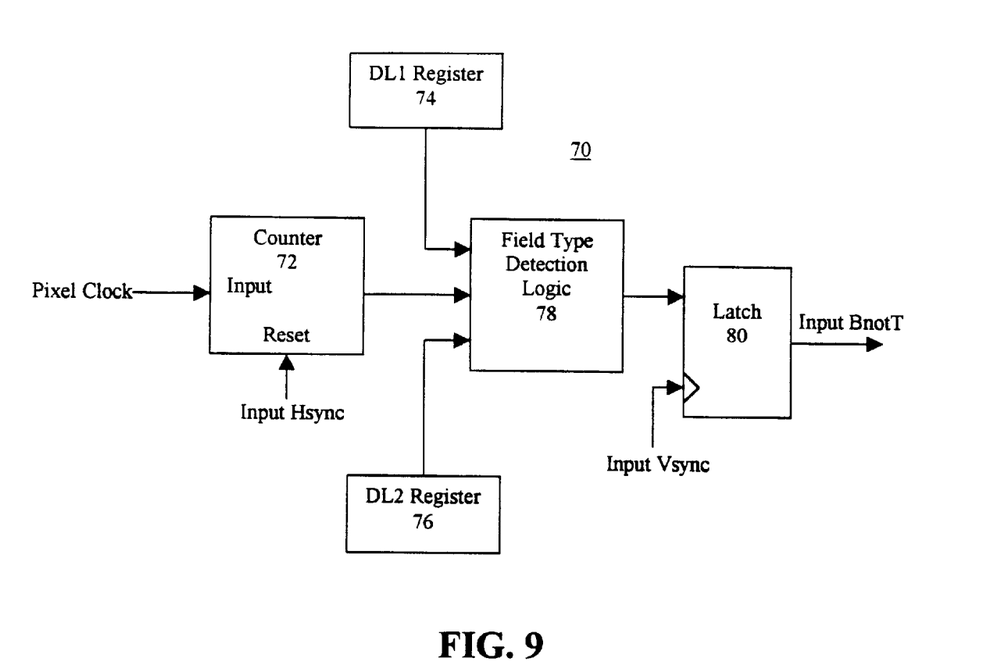
FIG. 9 is a block diagram of field type detector circuitry of the video interface of FIG. 4.
Figure 10:
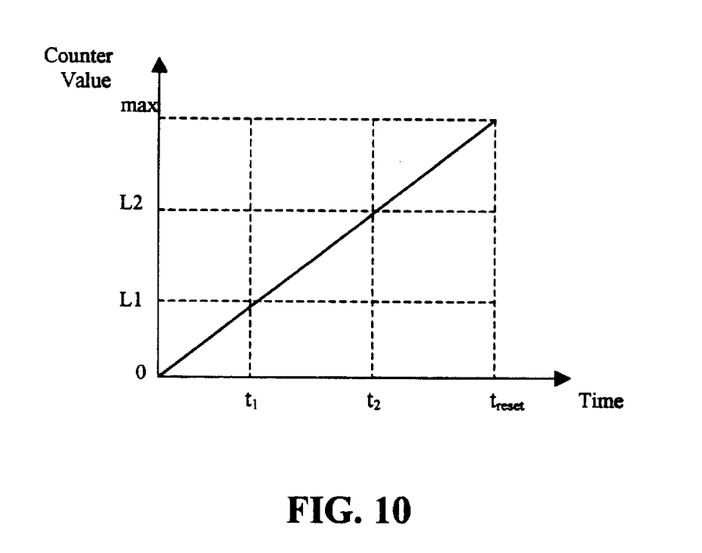
FIG. 10 is a timing diagram for the field type detector circuitry of FIG. 9.

In order to force memory controller 16 to alternately write the progressively scanned video data, system microcontroller 26 must override the Input BnotT signal. As stated previously, a field type detector within Video Input Interface 12 generates the Input BnotT signal. A block diagram of an exemplary field type detector 70 is shown in FIG. 9 and a timing diagram for field type detector 70 is shown in FIG. 10. Field type detector 70 includes a horizontal sample counter 72 having a pixel clock and Hsynch as inputs and having an output coupled to field type detector logic 78. An input of field type detector logic 78 is also coupled to an output of a first register 74 which, in turn, is coupled to system microcontroller 26 (not shown in FIG. 9). Similarly, another input of field type detector logic 78 is coupled to an output of a second register 76 which, in turn, is coupled to system microcontroller 26 (not shown in FIG. 9). An output of field type detector logic 78 is coupled to an input of a latch 80. Latch 80 generates the Input BnotT signal and is triggered by a Vsynch signal.

In operation, horizontal sample counter 72 is driven by the input pixel clock and is reset and restarted by an Hsynch signal. The output of counter 72 is compared to system microcontroller programmable values L1 and L2 stored in registers 74 and 76, respectively. During standard operation (when input BnotT is not being overridden), if the output of counter 72 is between value L1 and value L2 (during the time t1<t<t2) the output of field type detection logic 78 is high and the Input BnotT signal from latch 80 is high. In response to the high Input BnotT signal, memory controller 16 reads data into bottom field memory 20. During standard operation, if the output of counter 72 is below L1 or above L2 (during the time t<t1 OR t>t2) the output of field type detection logic 78 is low and the input BnotT signal is low. As a result, memory controller 16 writes video data into top field memory 18.

As described above, system microcontroller 26 detects the presence of progressively scanned video data by monitoring two or more identical Input BnotT signals. If a progressively scanned video signal is detected, the value of registers 74 and 76 may be adjusted to force the Input BnotT signal into desired states (i.e., into states that will cause memory controller 16 to write the progressively scanned video data into alternating top and bottom memories 18 and 20).

Figure 11:
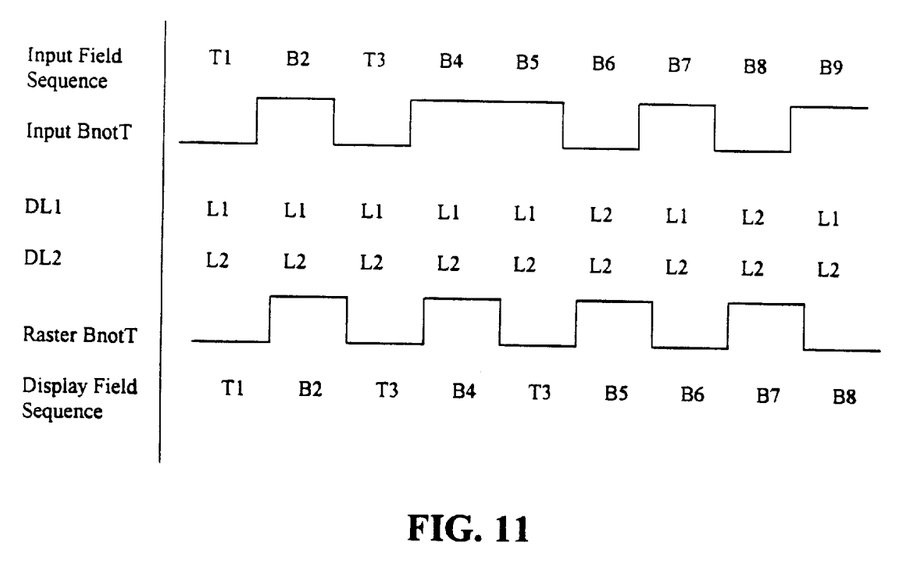
FIG. 11 is a timing diagram of an improved system processing a progressively scanned input signal in accordance with the alternative memory management method of FIG. 8.

Turning to FIG. 11, in conjunction with FIGS. 9 and 10, a timing diagram illustrating the operation of field type detector 70 in the override mode is illustrated. For fields numbered 1 through 4, the input signal is interlaced. At field 5, the input signal becomes progressive. Microcontroller 26 detects the progressive signal and determines whether the first segment (e.g., a 240p frame) of the progressive signal is being stored in top field memory 18 or bottom field memory 20. If the first segment of the progressive signal is stored in bottom field memory 20 (as shown), microcontroller 26 sets registers 74 and 76 equal to the same value (e.g., L2) for the next segment of the progressive signal. This forces Input BnotT low on field 6 since the output of counter can never be between the values in registers 74 and 76 if both registers contain the same value. Forcing Input BnotT low causes field 6 to overwrite the stale data in the top field memory 18 (i.e., the data corresponding to field 3). Afterwards, system microcontroller 26 alternates between allowing Input BnotT to go high and forcing Input BnotT to go low such that the progressive video data is written into top and bottom field memories 18 and 20. If the first segment of the progressive signal had been stored in top field memory 18 (not shown in FIG. 11), microcontroller 26 would set register 74 equal to zero and set register 76 equal to or greater than the maximum value that counter 72 could reach before being reset by a Hsynch input. This would force Input BnotT high since the output of counter could never be less than the value stored in register 74 or greater than the value stored in register 76. Forcing Input BnotT high would cause the next segment of the progressive signal to overwrite the stale data in that would be present in the bottom field memory 20. Afterwards, system microcontroller 26 would alternately write the progressive signal into top and bottom field memories 18 and 20 in a manner similar to that shown in FIG. 11.

Thus according to the principle of the present invention, there is provided a method of memory management for buffering digital video data of various formats (i.e., progressive, interlaced, CCIR 601/656 compliant, and MPEG compliant formats) in a video memory that is partitioned into first and second buffers.

While the present invention has been described with reference to the preferred embodiments, it is apparent that that various changes may be made in the embodiments without departing from the spirit and the scope of the invention, as defined by the appended claims.

What is claimed is:

1. A memory management process for buffering video signals in a memory partitioned into first and second buffers, the process comprising the steps of:

receiving a video signal;

generating a standard buffering signal in response to the reception of the video signal;

processing the standard buffering signal to determine if the received video signal is in a first format or in a second format;

buffering the received video signal in the memory in accordance with the standard buffering signal if the received video signal is in the first format, the first format video signal being alternately written into the first and second buffers and alternately read from the first and second buffers;

partially overriding the standard buffering signal to generate a modified buffering signal if the received video signal is in a second format; and buffering the second format video signal in the memory in accordance with the modified buffering signal such that the second format video signal is buffered in the memory without the loss of data.

2. The process of claim 1, wherein the second format is a digitized analog progressive (p) format.

3. The process of claim 1, wherein the second format is a 240p vertical format.

4. The process of claim 1, wherein the received signal in the second format is generated by one of a video game console, a VCR, and a cable text generator.

5. The process of claim 1, wherein the first format is one of an interlaced format, a CCIR 601/656 compliant format, and an MPEG compliant format.

6. The memory management process of claim 1, wherein the standard buffering signal includes a standard write signal and a standard read signal, the step of partially overriding the standard buffering signal to generate a modified buffering signal includes modifying the standard read signal, and the step of buffering the second format video signal in the memory in response to reception of the modified buffering signal includes the steps of:
   writing the second format video signal into one of the first or second buffers in accordance with the standard write signal; and
   reading the second format video signal from one of the first or second buffers in accordance with the modified read signal.

7. The memory management process of claim 1, wherein the standard buffering signal includes a standard write signal and a standard read signal, the step of partially overriding the standard buffering signal to generate a modified buffering signal includes modifying the standard write signal, and the step of buffering the second format video signal in the memory in response to reception of the modified buffering signal includes the steps of:
   alternately writing the second format video signal into the first and second buffers in accordance with the modified write signal; and
   alternately reading the second format video signal from the first and second buffers in accordance with the standard read signal.

8. A buffering system in a digital TV receiver for processing video signals having a plurality of formats, the buffering system comprising:
   a memory for buffering the video signals, the memory having a first buffer and a second buffer;
   means for generating a standard buffering signal in response to the reception of a video signal;
   means for processing the standard buffering signal to determine if the received video signal is in a first format or in a second format;
   means for buffering the received video signal in the memory in accordance with the standard buffering signal if the received video signal is in the first format, the first format video signal being alternately written into the first and second buffers and alternately read from the first and second buffers;
   means for partially overriding the standard buffering signal to generate a modified buffering signal if the received video signal is in a second format; and
   means for buffering the second format video signal in the memory in accordance with the modified buffering signal such that the second format video signal is buffered in the memory without the loss of data.

9. The buffering system of claim 8, wherein the first format is one of an interlaced format, a CCIR 601/656 compliant format, and an MPEG compliant format.

10. The buffering system of claim 8, wherein the second format is a progressive format.

11. The buffering system of claim 8, wherein the standard buffering signal includes a standard write signal and a standard read signal, the modified buffering signal includes the standard write signal and a modified read signal, and the means for buffering the second format video signal further includes:
   means for writing the second format video signal into one of the first or second buffers in accordance with the standard write signal; and
   means for reading the second format video signal from one of the first or second buffers in accordance with the modified read signal.

12. The buffering system of claim 8, wherein the standard buffering signal includes a standard write signal and a standard read signal, the modified buffering signal includes a modified write signal and the standard read signal, and the means for buffering the second format video signal further includes:
   means for alternately writing the second format video signal into the first and second buffers in accordance with the modified write signal; and
   means for alternately reading the second format video from the first and second buffers in accordance with the standard read signal.

13. A memory management process for buffering video signals in a memory partitioned into first and second buffers, the process comprising the steps of:
   receiving a video signal;
   generating a standard buffering signal in response to reception of the video signal;
   processing the standard buffering signal to determine if the received video signal is interlaced or progressive;
   buffering the received video signal in the memory in accordance with the standard buffering signal if the received video signal is interlaced, the interlaced video signal being buffered in the memory such that the fields of the interlaced video are alternately written into the first and the second buffers and alternately read from the first and second buffers;
   partially overriding the standard buffering signal to generate a modified buffering signal if the received video signal is progressive; and
   buffering the received progressive video signal in the memory in response to reception of the modified buffering signal such that the progressive signal is buffered in the memory without the loss of frames of data.

14. The memory management process of claim 13, wherein the standard buffering signal includes a standard write signal and a standard read signal, the step of partially overriding the standard buffering signal to generate a modified buffering signal includes modifying the standard read signal, and the step of buffering the progressive video signal in the memory in response to reception of the modified buffering signal includes the steps of:
   writing consecutive frames of the progressive video signal into one of the first or second buffers in accordance with the standard write signal; and
   reading consecutive frames of the progressive video signal from one of the first or second buffers in accordance with the modified read signal.

15. The memory management process of claim 13, wherein the standard buffering signal includes a standard write signal and a standard read signal, the step of partially overriding the standard buffering signal to generate a modified buffering signal includes modifying the standard write signal, and the step of buffering the progressive video signal in the memory in response to reception of the modified buffering signal includes the steps of:

alternately writing frames of the progressive video signal into the first and second buffers in accordance with the modified write signal; and     alternately reading frames of the progressive video signal from the first and second buffers in accordance with the standard read signal.

16. A buffering system for processing interlaced and progressive video signals, the buffering system comprising:

a memory for buffering the video signals, the memory having a first buffer and a second buffer;

a video signal source for providing interlaced and progressive video signals to the memory and generating a memory write signal;

a signal generator for generating a memory read signal;

a memory controller communicatively connected to the memory, video signal source, and signal generator, the memory controller responsive to the memory write signal to cause interlaced and progressive video signals provided by the video signal source to be written into the memory such that fields of an interlaced video signal are alternately written into the first buffer and the second buffer and frames of a progressive video signal are consecutively written into either the first buffer or the second buffer, the memory controller responsive to the memory read signal to cause data to be alternately read from the first buffer and the second buffer; and     a system controller communicatively connected to the memory controller, the system controller detecting when the memory controller is causing a first frame of the progressive video signal to be written into one of the first and second buffers, the system controller partially overriding the operation of the memory controller such that subsequent frames of the progressive video signal are alternately written into the first buffer and the second buffer.

17. A buffering system for processing interlaced and progressive video signals, the buffering system comprising:

a memory for buffering the video signals, the memory having a first buffer and a second buffer;

a video signal source for providing interlaced and progressive video signals to the memory and generating a memory write signal;

a signal generator for generating a memory read signal;

a memory controller communicatively connected to the memory, video signal source, and signal generator, the memory controller responsive to the memory write signal to cause interlaced and progressive video signals provided by the video signal source to be written into the memory such that fields of an interlaced video signal are alternately written into the first buffer and the second buffer and frames of a progressive video signal are consecutively written into either the first buffer or the second buffer, the memory controller responsive to the memory read signal to cause data to be alternately read from the first buffer and the second buffer; and     a system controller communicatively connected to the memory controller, the system controller detecting when the memory controller is causing a first frame of the progressive video signal to be written into one of the first and second buffers, the system controller partially overriding the operation of the memory controller such that frames of the progressive video signal are consecutively read from either the first buffer or the second buffer.

* * * * *